(12) United States Patent
Yokoe

(10) Patent No.: US 9,903,479 B2
(45) Date of Patent: Feb. 27, 2018

(54) VALVE DEVICE

(71) Applicant: NIDEC SANKYO CORPORATION, Nagano (JP)

(72) Inventor: Satoru Yokoe, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 15/128,413

(22) PCT Filed: Mar. 23, 2015

(86) PCT No.: PCT/JP2015/058655
§ 371 (c)(1),
(2) Date: Sep. 22, 2016

(87) PCT Pub. No.: WO2015/146871
PCT Pub. Date: Oct. 1, 2015

(65) Prior Publication Data
US 2017/0108137 A1    Apr. 20, 2017

(30) Foreign Application Priority Data

Mar. 27, 2014 (JP) ................................ 2014-065914

(51) Int. Cl.
*F16K 3/08* (2006.01)
*F16K 31/53* (2006.01)
(Continued)

(52) U.S. Cl.
CPC ............... *F16K 3/085* (2013.01); *F16K 3/08* (2013.01); *F16K 11/074* (2013.01);
(Continued)

(58) Field of Classification Search
CPC .. F25B 41/04; F16K 3/085; F16K 3/08; F16K 31/041; F16K 31/535; F16K 11/074; F16K 11/0743
See application file for complete search history.

(56) References Cited

U.S. PATENT DOCUMENTS 6,926,250 B1 * 8/2005 Hashimoto ........... F16K 11/074
251/129.11
7,437,888 B2 * 10/2008 Son ....................... F16K 11/074
62/527
(Continued)

FOREIGN PATENT DOCUMENTS

EP          2924326         9/2015
JP       2000-346227      12/2000
(Continued)

OTHER PUBLICATIONS

"International Search Report (Form PCT/ISA/210) of PCT/JP2015/058655", dated Jun. 9, 2015, with English translation thereof, pp. 1-4.
(Continued)

*Primary Examiner* — Eric Keasel
(74) *Attorney, Agent, or Firm* — JCIPRNET

(57) ABSTRACT

A valve device includes: a drive source; a turning member; a valve body, being fixed to the turning member and integrally turned with the turning member; and a valve seat, being sliding contacted with an end face of the valve body opposite to the end face of the valve body contacting with the turning member. The valve seat has at least one outflow hole for fluid passing through the valve device. The valve body has a throttle part being a minute hole that communicates with the outflow hole in a part of a turning angle of the valve body. A flow passage has an opening part provided between opposed faces of the turning member and the valve body, thus the throttle part is communicated with an inflow
(Continued)

hole for the fluid and inflow of an individual matter having a size unable to pass through the throttle part is shielded.

19 Claims, 10 Drawing Sheets

(51) Int. Cl.
    *F25B 41/04*     (2006.01)
    *F16K 31/04*     (2006.01)
    *F16K 11/074*     (2006.01)

(52) U.S. Cl.
    CPC .......... *F16K 31/041* (2013.01); *F16K 31/535* (2013.01); *F25B 41/04* (2013.01)

(56) References Cited

U.S. PATENT DOCUMENTS

| | | | |
|---|---|---|---|
| 7,475,704 B2* | 1/2009 | Hara | F16K 11/0743 137/625.11 |
| 7,793,915 B2* | 9/2010 | Ozawa | F16K 11/074 251/211 |
| 8,091,380 B2* | 1/2012 | Chen | F16K 11/074 62/118 |
| 8,844,569 B2* | 9/2014 | Lin | F16K 11/0743 137/625.45 |
| 2006/0060807 A1 | 3/2006 | Hara et al. | |
| 2007/0084238 A1 | 4/2007 | Son et al. | |
| 2012/0080102 A1 | 4/2012 | Kee et al. | |

FOREIGN PATENT DOCUMENTS

| | | |
|---|---|---|
| JP | 2002-303418 | 10/2002 |
| JP | 2003-194251 | 7/2003 |
| JP | 2004-156771 | 6/2004 |
| JP | 2007-144468 | 6/2007 |

OTHER PUBLICATIONS

"Search Report of Europe Counterpart Application", dated Oct. 11, 2017, p. 1-p. 7, in which the listed references were cited.

* cited by examiner

VALVE DEVICE

CROSS-REFERENCE TO RELATED APPLICATION

This application is a 371 application of international PCT application serial no. PCT/JP2015/058655, filed on Mar. 23, 2015, which claims the priority benefit of Japan application no. 2014-065914, filed on Mar. 27, 2014. The entirety of each of the above-mentioned patent applications is hereby incorporated by reference herein and made a part of this specification.

TECHNICAL FIELD

The present invention relates to a valve device. More specifically, the present invention relates to a valve device which is capable of setting a minute flow amount.

BACKGROUND ART

A gas valve 1 structured to control a supply amount of fuel gas to a gas burner of a gas apparatus is disclosed in Patent Literature 1 described below. In the gas valve 1 in Patent Literature 1, a stepping motor 64 is rotated in a normal direction from a valve closed state to move a second slider 63 to a front direction and thereby an operating rod 2 interlockingly opens a gas opening/closing valve 3 and presses a first slider 5 in a front direction to turn a disk member 46 in the normal direction. Then, the fuel gas flowed into a disk accommodation chamber 41 from an inside passage 13 through an elongated hole 42 is communicated with a second communicating path 15 through a second communicating hole 47b of the disk member 46, and the fuel gas is passed through a gas outlet port 16 and is flowed out to a mixing tube of the gas burner and ignition of the gas burner is performed. After the gas burner is ignited, the stepping motor 64 is rotated in a normal direction or a reverse direction to turn the disk member 46 so that one of communicating holes 47a, 47b and 47c overlapped with an opening 43 is selected and, as a result, a gas flow rate to the gas outlet port 16 is regulated.

In the gas valve 1, in order to be capable of setting the minimum gas flow rate such a degree that a flame of the gas burner is not extinguished depending on the gas type, the disk member 46 can be appropriately exchanged for a disk member 46 provided with a first communicating hole 47a having a predetermined opening area corresponding to respective gas types. Opening areas of communicating holes of the disk member 46 become smaller from a third communicating hole 47c, a second communicating hole 47b and a first communicating hole 47a in this order. The gas burner is set in a high flame state by communicating the third communicating hole 47c with the opening 43, in a medium flame state by communicating the second communicating hole 47b with the opening 43, and in the minimum gas flow rate such a degree that a flame of the gas burner is not extinguished in a fully opened state by communicating the first communicating hole 47a whose opening area is the smallest with the opening 43.

CITATION LIST

Patent Literature

[Patent literature 1] Japanese Patent Laid-Open No. 2002-303418

SUMMARY

Technical Problem

In a case that the first communicating hole 47a of the disk member 46 is communicated with the opening 43 in order that the gas burner is set and used in the smallest gas flow rate, when foreign matters such as dust and dirt entered from the outside or a broken piece, a peeled-off piece and the like of structural members generated in the gas valve 1 are mixed to fuel gas circulating in the gas valve 1, the foreign matter may be flowed into the first communicating hole 47a which is a small hole and the first communicating hole 47a is closed and, as a result, firepower of the gas burner is unstable.

In view of the problem described above, the present invention provides a valve device which is capable of setting a minute flow amount of fluid and of preventing a flow passage from being disturbed by a foreign matter.

Solution to Problem

To solve the above mentioned problem, the present invention provides a valve device including: a drive source; a turning member which is driven and turned by the drive source; a valve body which is fixed to the turning member in a state that an end face of the valve body and an end face of the turning member in an axial direction are contacted with each other and is integrally turned with the turning member; and a valve seat sliding contacts with an end face of the valve body opposite to the end face of the valve body contacting with the turning member. The valve seat is provided with at least one outflow hole for fluid which is passed through the valve device, the valve body is provided with a throttle part which is a minute hole capable of being communicated with the outflow hole in a part of a turning angle of the valve body, and a flow passage is provided with an opening part formed between opposed faces of the turning member and the valve body, so that the throttle part is communicated with an inflow hole for the fluid and so that inflow of an individual matter having a size which is unable to pass through the throttle part is shielded.

In a flow passage reaching to the throttle part which is a minute hole, an opening part is provided through which a foreign matter having a size unable to pass through the throttle part is not entered and thus the foreign matter is prevented from flowing into the throttle part and the flow passage can be prevented from being disturbed by the foreign matter.

In this case, it is desirable that the flow passage is a stepped part formed in an outer circumferential edge of the opposed face of the valve body or an outer circumferential edge of the opposed face of the turning member, a height in an axial direction of the opening part of the stepped part is smaller than a minimum diameter of the throttle part, and a length in a circumferential direction of the opening part of the stepped part is set to be a length so that an area of the opening part obtained by multiplying the length by the height in the axial direction is larger than an opening area of the throttle part. In other words, it is preferable that the opening part is a space formed between the opposed face of the turning member on a side of the valve body and the opposed face of the valve body on a side of the turning member, a width in an axial direction of the space is smaller than a minimum diameter of the throttle part, and a length in a circumferential direction of the space is set so that a flow amount of the fluid flowing through the space is larger than a flow amount which is capable of passing the throttle part. In this case, it may be structured that the space as the opening part is formed by thinning an entire periphery of a portion of an outer circumferential edge of an abutted face of the valve body with the turning member, the valve body is formed with a recessed part surrounding the throttle part, and the recessed part is communicated with the space so that the fluid from the opening part is flowed into the throttle part through the recessed part.

When a total area of the opening part of the stepped part which is a flow passage reaching to the throttle part is set to be larger than an opening area of the throttle part, the maximum flow amount of the throttle part is capable of being maintained while entering of a foreign matter having a size which is unable to pass through the throttle part is prevented.

Further, if possible, it is desirable that the stepped part is provided over the entire periphery of an outer circumferential edge of the valve body or of an outer circumferential edge of the turning member.

When the stepped part is provided over the entire periphery of the outer circumferential edge, even in a case that a plurality of foreign matters is stagnated in the opening part, a flow amount of the throttle part is capable of being maintained.

Further, it is desirable that the opening part is formed with at least one shielding part for closing a part of an opening of the opening part.

Since the stepped part is formed so that a narrow space is continuously formed in a circumferential direction, there is a possibility that a foreign matter is entered whose size does not reach to a height in the axial direction of the opening part but its length in a circumferential direction is longer than the diameter of the throttle part. For example, a thread-shaped foreign matter such as a hair or a thin plate shaped foreign matter such as a peeled-off piece of coating film may be entered. A possibility of entering of these foreign matters can be reduced by appropriately providing the shielding part in the opening part.

In a case that the turning member is a gear member provided with a teeth part on a peripheral face of the turning member, it is desirable that the stepped part is provided in the valve body. Further, it is desirable that the stepped part is communicated with the throttle part.

In a case that the stepped part is provided in the turning member which is a gear member, when a teeth part is shifted in an axial direction by a thickness of the stepped part, the size of the turning member is increased and, when the teeth part is cut out and a thickness of the teeth part is reduced by the thickness of the stepped part, engaging accuracy may be deteriorated and torque reduction may be occurred.

Further, it may be structured that the valve body is provided with a cut-out part which is cut out toward a turning center side from an outer periphery of the valve body on an opposed face to the valve seat, and the cut-out part exposes an entire periphery of at least one of the outflow holes in a part of a turning angle of the valve body to allow the inflow hole communicate with the outflow hole. Further, it may be structured that the cut-out part is disposed at a position different from a position of the throttle part, the cut-out part is provided with a size which is capable of exposing an entire periphery of at least one of the outflow hole, and the inflow hole and the outflow hole are communicated with each other through the cut-out part at a position where the cut-out part faces the outflow hole.

Since a flow passage through the cut-out part is formed separately, circulation of a flow amount corresponding to the opening diameter of the outflow hole can be attained in addition to circulation of a minute flow amount through the throttle part and thus versatility of the valve device is enhanced. Furthermore, a foreign matter mixed into the valve device is flowed out from the outflow hole to the outside of the valve device and thus a foreign matter is prevented from being accumulatively stagnated in the vicinity of the opening part of the flow passage to the throttle part.

Further, it may be structured that the opposed face of the turning member to the valve body is formed with a protruded part which is protruded to a side of the valve body, the opposed face of the valve body to the turning member is formed with a recessed part to which the protruded part is fitted, at least a pair of the protruded part and the recessed part are provided, at least one of the recessed parts is a through-hole which is penetrated to the cut-out part, and the protruded part fitted to the recessed part which is the through-hole is caulked on a side of the cut-out part and thereby the valve body is fixed to the turning member.

Further, it is desirable that the throttle part is formed in a thin wall part between recessed parts with larger diameters than the throttle part which are provided at both ends in an axial direction of the valve body so as to be overlapped with each other in the axial direction of the valve body, and the throttle part is formed with an opening in a mortar shape.

The throttle part is formed in a small diameter and thus its flow amount is affected by a slight deformation of the valve body. Therefore, the throttle part is formed on an inner side in an axial direction by avoiding both end sides in the axial direction where a deformed amount is large and thus influence due to deformation of the valve body is reduced. Further, since an opening of the throttle part is formed in a mortar shape, a length of a thin pin having a small diameter of a die is minimized and durability of the die can be enhanced.

As a specific structure of the valve device, it may be structured that the valve device includes a base to which the valve seat is fixed, and a cup-shaped sealing cover. The base is covered with the sealing cover so that the inflow hole for the fluid, a rotor of a motor structuring the drive source, the turning member, the valve body, and a valve seat face of the valve seat are covered by the sealing cover, and a valve chamber provided with the inflow hole and the outflow hole is sectioned by the sealing cover together with the base and, when the throttle part of the valve body is turned to a position facing the outflow hole by the motor, the fluid is passed through the throttle part from the opening part and is flowed out from the outflow hole. In this case, it may be structured that the drive source is a stepping motor, a rotor of the stepping motor is disposed to an inner side of the sealing cover, the rotor is rotatably supported by a rotor support shaft whose upper end is fixed to a bottom part of the sealing cover and its lower end is fixed to a center of the base, the turning member provided with a teeth part engaging with a pinion of the rotor and the valve body are rotatably supported by a support shaft fixed to the valve seat, and a bottom face of the valve body and the valve seat face are polished flatly and directly contacted with each other.

Effects of the Invention

According to the valve device in accordance with the present invention, a minute flow amount of fluid is capable of being set and a flow passage is prevented from being disturbed by a foreign matter.

DESCRIPTION OF EMBODIMENTS (Entire Structure)

Figure 1A:
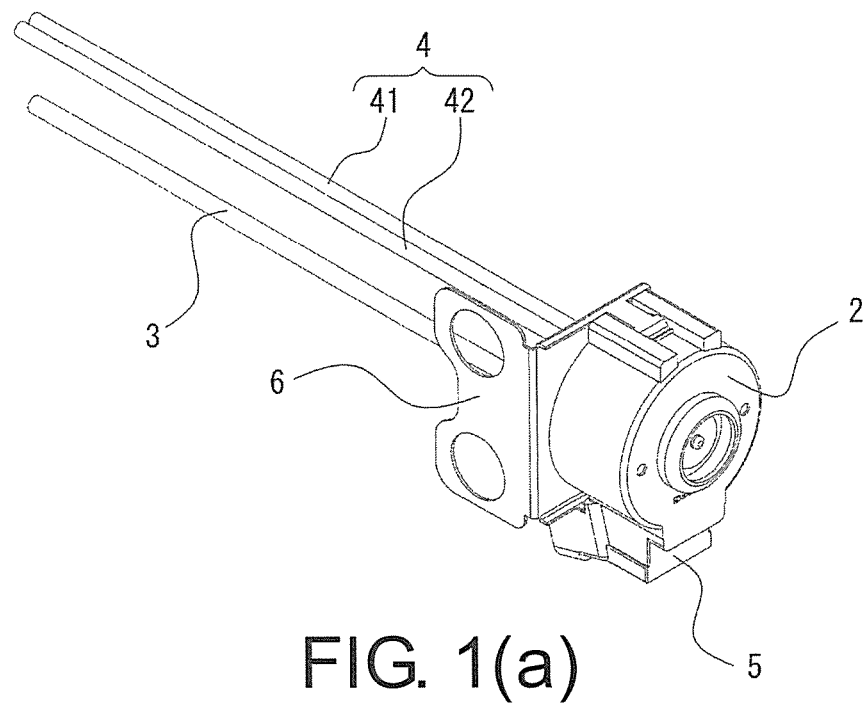
FIGS. 1(a) and 1(b) are perspective views showing a refrigerant valve device in accordance with an embodiment of the present invention.
Figure 1B:
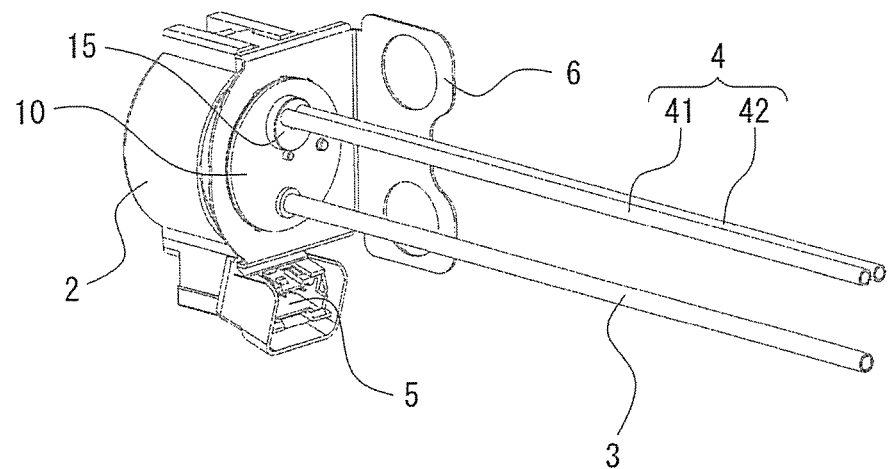

An embodiment of the present invention will be described in detail below with reference to the accompanying drawings. FIGS. 1(a) and 1(b) are perspective views showing a refrigerant valve device 1 in accordance with an embodiment of the present invention. A refrigerant valve device 1 is disposed between a compressor and a cooler in a refrigerant flow passage in an inside of a refrigerator and regulates a supply amount of refrigerant for cooling the inside of the refrigerator.

The refrigerant valve device 1 includes a valve main body 2, an inflow pipe 3 configured to flow refrigerant which is fluid into the valve main body 2, a first outflow pipe 41 and a second outflow pipe 42 (hereinafter, also collectively referred to as an "outflow pipe 4") configured to flow the refrigerant out from the valve main body 2, a connector 5 configured to secure an electric connection with an external control device, and an attaching plate 6 configured to attach the refrigerant valve device 1 to an inside of the refrigerator. In the following descriptions, for convenience, extending directions of the inflow pipe 3 and the outflow pipe 4 are referred to as an upper and lower direction, the valve main body 2 is disposed on an upper side and the inflow pipe 3 and the outflow pipe 4 are disposed on a lower side.

Figure 2:
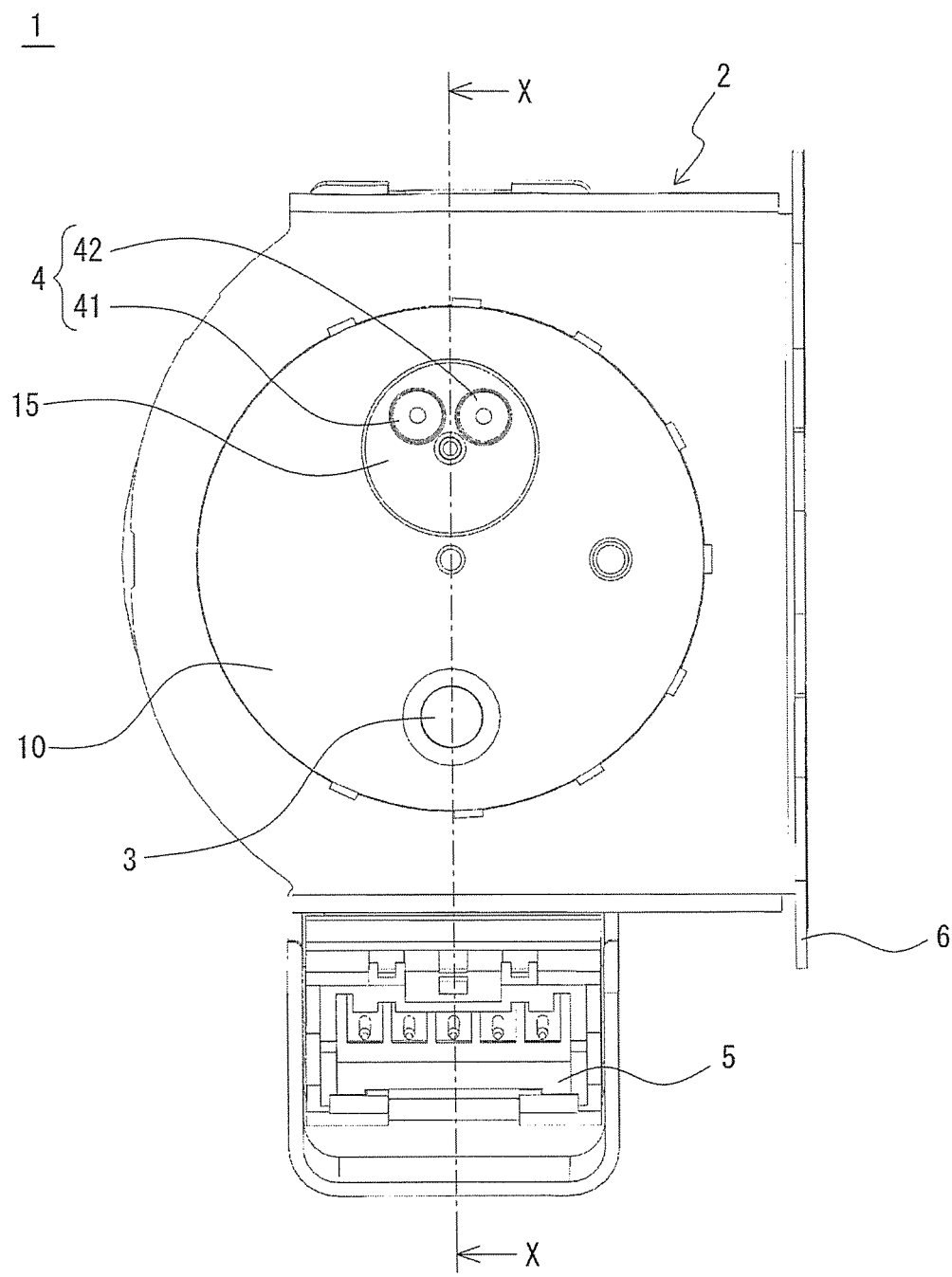
FIG. 2 is a bottom view showing a refrigerant valve device.
Figure 3:
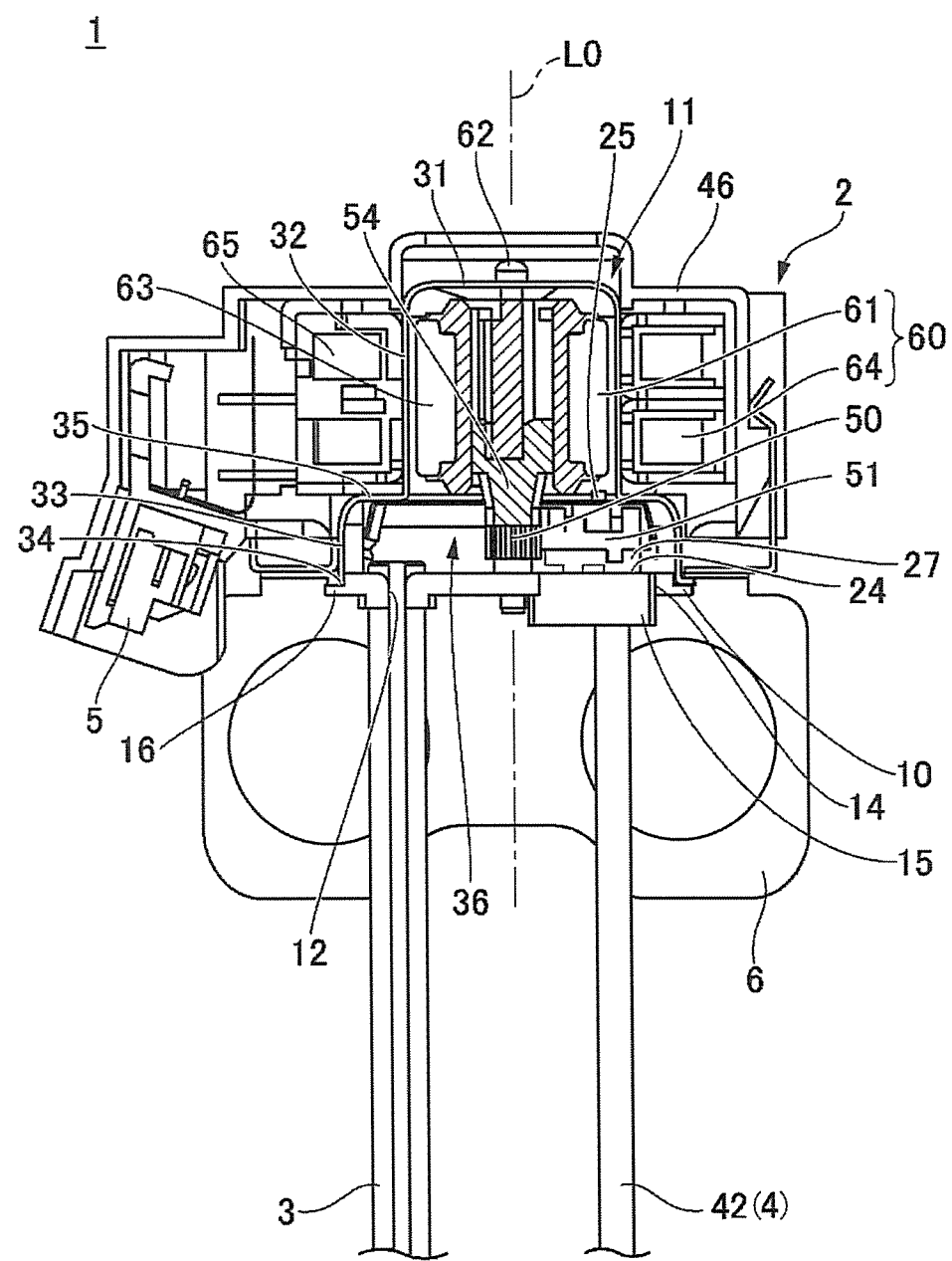
FIG. 3 is the "X-X" line cross-sectional view in FIG. 2 showing a refrigerant valve device.
Figure 4:
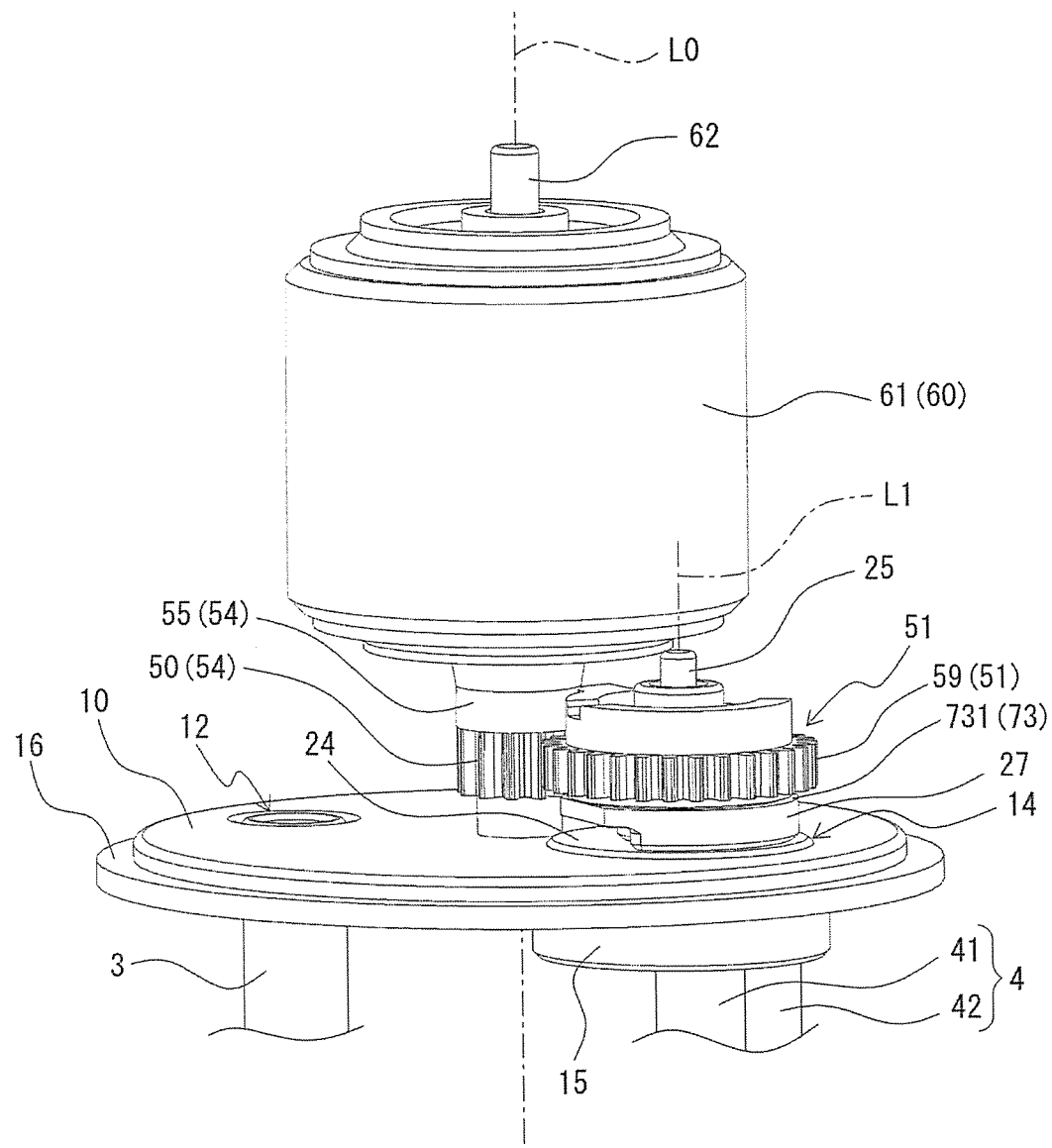
FIG. 4 is a perspective view showing a valve body drive mechanism.

FIG. 2 is a bottom view showing the refrigerant valve device 1 which is viewed from a side of the inflow pipe 3 and the outflow pipe 4. FIG. 3 is a cross-sectional view showing the refrigerant valve device in FIG. 2 which is cut by the "X-X" line. FIG. 4 is a perspective view showing a valve body drive mechanism. As shown in FIG. 3, the valve main body 2 includes a base 10 having a disk shape and a cup-shaped sealing cover 11 whose opening is directed toward a lower side and which covers the base 10 from an upper side. As shown in FIG. 4, the base 10 is formed with a refrigerant inlet port 12 which is an inflow hole of refrigerant and a valve seat attaching hole 14 to which a valve seat 15 is attached. The valve seat 15 is fixed to the base 10. An outer circumferential edge of the base 10 is formed with a ring-shaped base side flange 16 whose plate thickness is reduced by recessing its upper face to a lower side. The inflow pipe 3 is connected with the refrigerant inlet port 12.

Figure 5B:
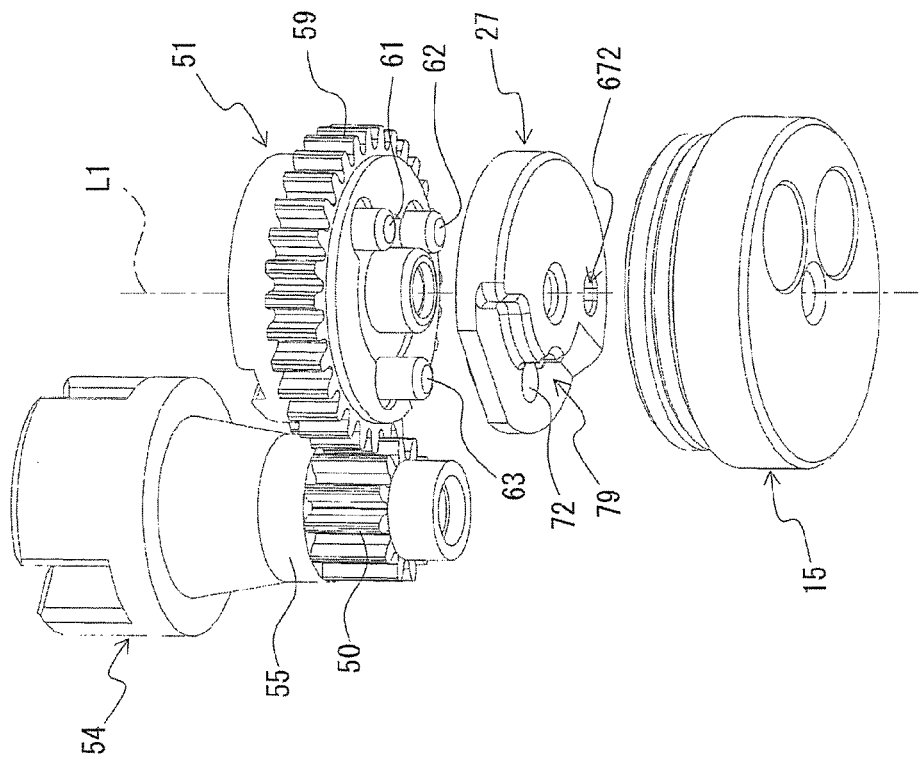
FIGS. 5(a) and 5(b) are exploded perspective views showing a valve body drive mechanism which are viewed from an upper side and a lower side.
Figure 5A:
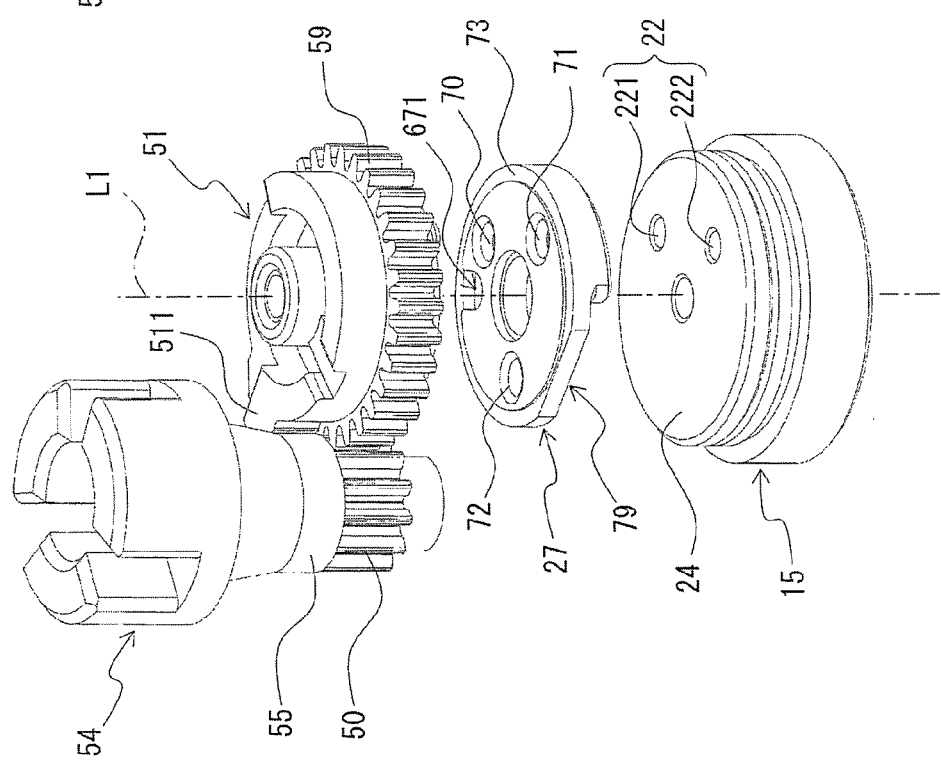

FIG. 5(a) is an exploded perspective view showing a part of a valve body drive mechanism viewed from an upper side, and FIG. 5(b) is its exploded perspective view which is viewed from a lower side. As shown in FIGS. 5(a) and 5(b), the valve seat 15 is formed so that its planar shape viewed in an axial line "L1" direction is circular, and an upper face of the valve seat 15 is a flat valve seat face 24. A first refrigerant outlet port 221 and a second refrigerant outlet port 222 (hereinafter, also collectively referred to as a "refrigerant outlet port 22") which are outflow holes for refrigerant passing through the refrigerant valve device 1 are formed at positions displaced from a center axial line of the valve seat 15. In this embodiment, an outflow pipe 4 is connected with the refrigerant outlet port 22.

As shown in FIG. 3, the sealing cover 11 is, from an upper side to a lower side, provided with a circular bottom part 31, a small diameter tube part 32 which is extended from an outer circumferential edge of the bottom part 31 to a lower side, a large diameter tube part 33 having a diameter larger than the small diameter tube part 32, and a case side flange 34 which is enlarged from a lower end edge (opening edge) of the large diameter tube part 33 toward an outer peripheral side. A ring-shaped part 35 which is extended in a direction intersecting the center axial line "L0" of the base 10 is provided between the small diameter tube part 32 and the large diameter tube part 33 so as to connect the small diameter tube part 32 with the large diameter tube part 33. The sealing cover 11 is fixed to the base 10 in a state that an upper side portion of the base 10 is inserted into an inner side of a lower end opening edge of the large diameter tube part 33 and the case side flange 34 is abutted with the base side flange 16 from an upper side. The sealing cover 11 is placed to cover the base 10 so as to cover the refrigerant inlet port 12, a rotor 61, a valve body drive gear 51, a valve body 27 and the valve seat face 24 and thereby the sealing cover 11 sections and structures a valve chamber 36 having the refrigerant inlet port 12 and the refrigerant outlet port 22 together with the base 10.

The valve main body 2 is structured with a stepping motor 60 as a drive source for driving the valve body 27 by utilizing an inside and an outside of the sealing cover 11. The rotor 61 of the stepping motor 60 is disposed to an inner side of the sealing cover 11. The rotor 61 is rotatably supported by a rotor support shaft 62 whose upper end is fixed to the bottom part 31 of the sealing cover 11 and its lower end is fixed to a center of the base 10. An axial line of the rotor support shaft 62 is coincided with the center axial line "L0" of the base 10 and is extended in parallel with a support shaft 25 which is attached to the valve seat 15. A ring-shaped drive magnet 63 is mounted on the rotor 61.

A stator 64 of the stepping motor 60 is placed on the ring-shaped part 35 of the sealing cover 11 and is disposed on an outer peripheral side of the sealing cover 11. The stator 64 is mounted with drive coils 65. The drive coils 65 face the drive magnet 63 of the rotor 61 through the small diameter tube part 32 of the sealing cover 11. The drive coil 65 is electrically connected with a connector 5 and the stepping motor 60 is driven and controlled by an external control device which is connected through the connector 5. The stator 64 and the connector 5 are accommodated to an inner side of an outer case 46.

(Valve Body Drive Mechanism)

A valve body drive mechanism of the refrigerant valve device 1 in this embodiment is, as shown in FIG. 4, structured of the rotor 61 of the stepping motor 60 which is a drive source, a valve body drive gear 51 which is a turning member provided with a teeth part 59 engaged with a pinion 50 provided in a pinion structural member 54 of the rotor 61, a valve body 27 which is located on a lower side of the valve body drive gear 51 and is fixed to the valve body drive gear 51 in a state that its end face is contacted with an end face of the valve body drive gear 51 in the axial line direction so as to be turned together with the valve body drive gear 51, and the valve seat 15 which is located on a lower side of the valve body 27, and the valve seat 15 is provided with a valve seat face 24 which is sliding contacted with a bottom face of the valve body 27. The bottom face of the valve body 27 and the valve seat face 24 are closely contacted with each other without a gap therebetween by being polished flatly, and the refrigerant is prevented from being leaked from the gap between sliding faces of the bottom face of the valve body 27 and the valve seat face 24. The valve body drive gear 51 and the valve body 27 are rotatably supported by a support shaft 25 which is fixed to a center of the valve seat 15, and their turning centers ("L1") are the same as each other.

As shown in FIG. 5(a), an arm part 511 is provided which is protruded from a part in a circumferential direction of the valve body drive gear 51 to an outer side in a radial direction. The arm part 511 is abutted with an abutted part 55 of the pinion structural member 54 from one side or the other side around the axial line "L1" when the valve body drive gear 51 is turned and reached to a predetermined angular position and the arm part 511 restricts a turnable range of the valve body drive gear 51.

Figure 6A:
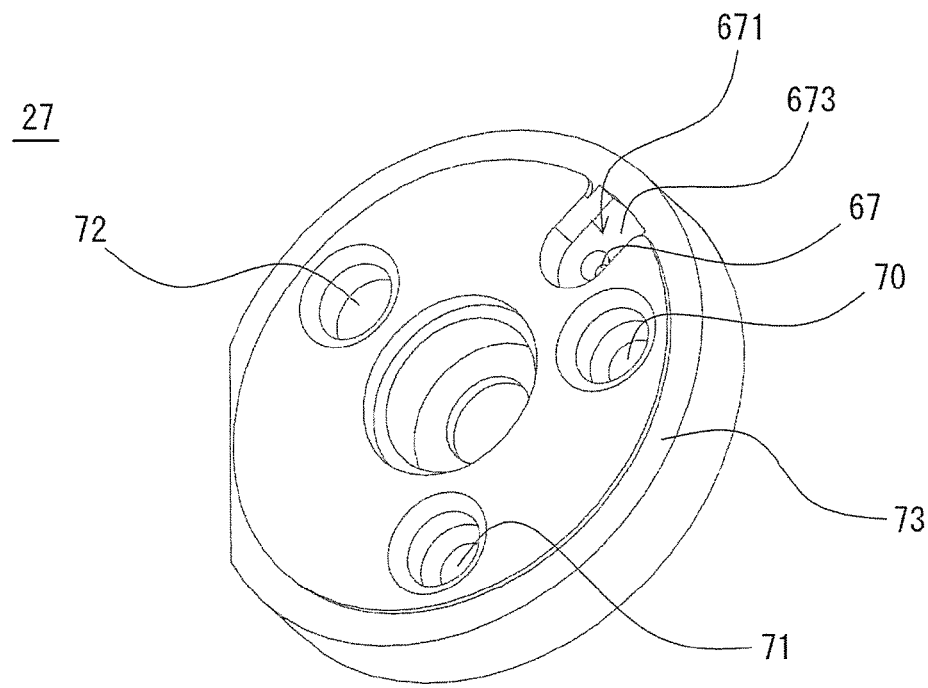
FIGS. 6(a) and 6(b) are perspective views showing a valve body which are viewed from an upper side and a lower side.
Figure 6B:
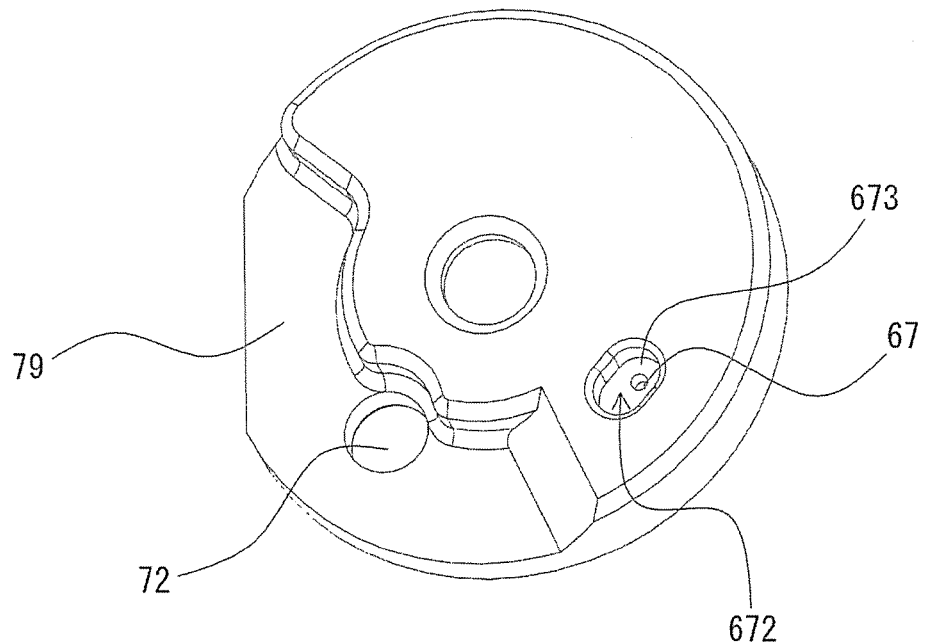
Figure 7:
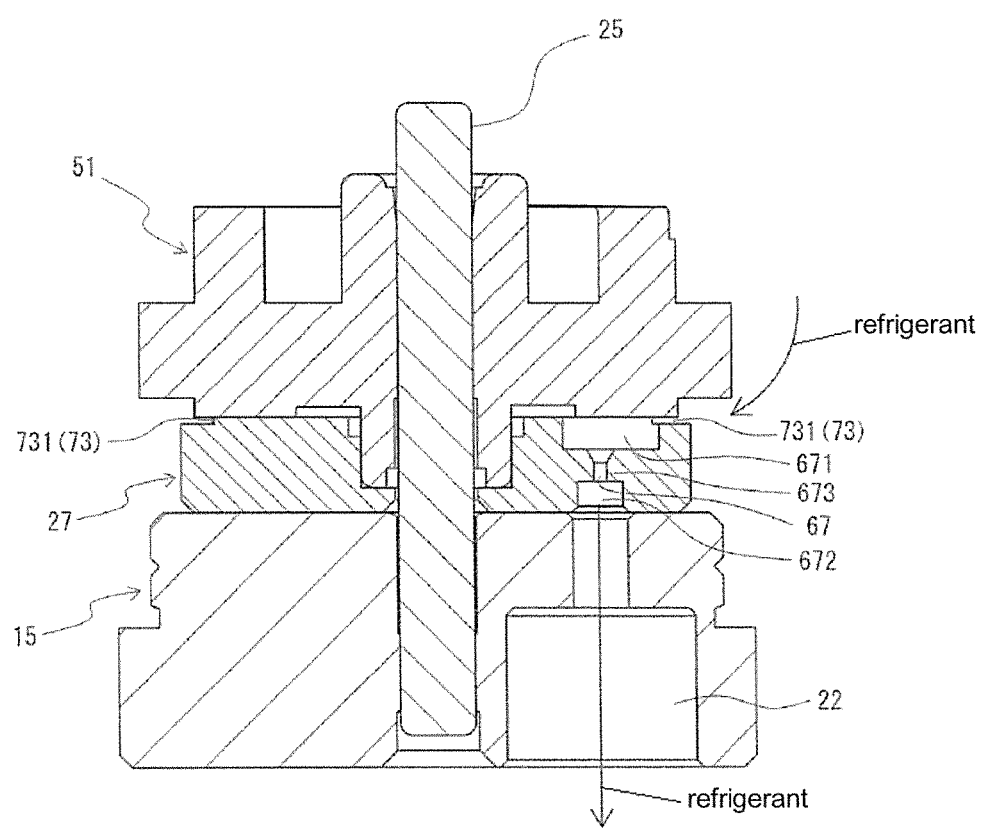
FIG. 7 is a cross-sectional view showing a throttle part communicating state.
Figure 8:
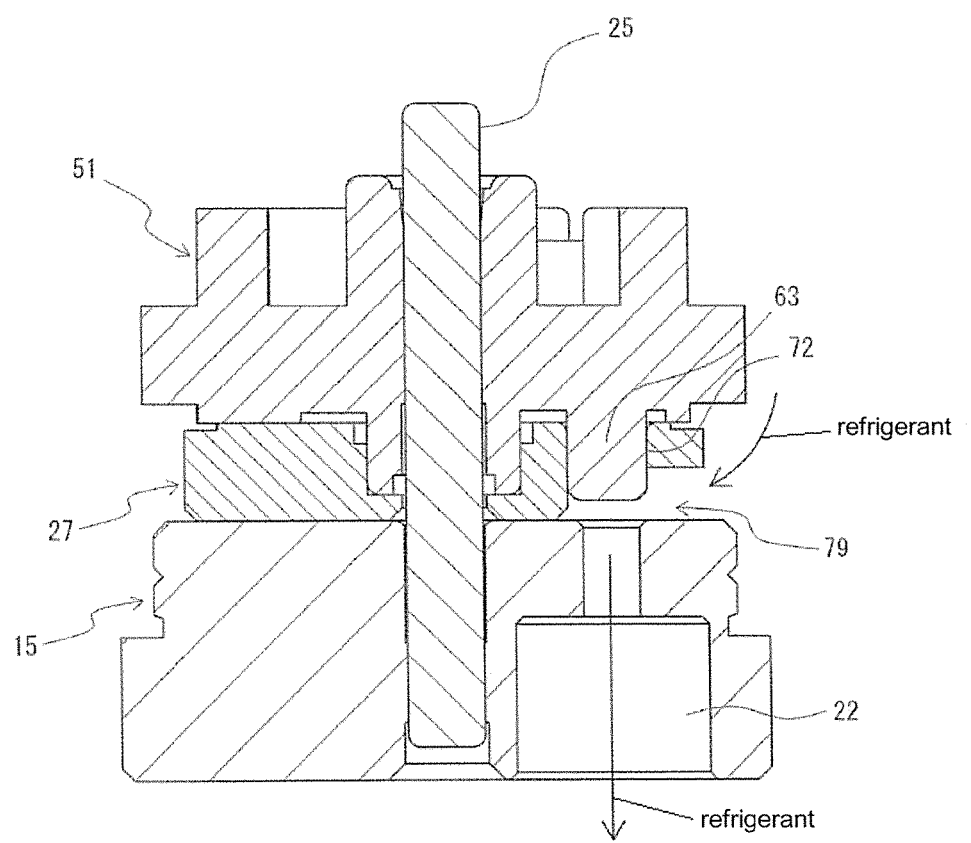
FIG. 8 is a cross-sectional view showing a cut-out part communicating state.

FIG. 6(a) is a perspective view showing the valve body 27 which is viewed from an upper side and FIG. 6(b) is a perspective view showing the valve body 27 which is viewed from a lower side. FIG. 7 is a longitudinal sectional view showing the valve body drive gear 51, the valve body 27 and the valve seat 15 in a minute flow amount state that a throttle part 67 of the valve body 27 described below and the refrigerant outlet port 22 are overlapped with each other in the axial line "L1" direction and the refrigerant inlet port 12 and the refrigerant outlet port 22 are communicated with each other. FIG. 8 is a longitudinal sectional view showing the valve body drive gear 51, the valve body 27 and the valve seat 15 in a large flow amount state that a cut-out part 79 of the valve body 27 described below and the refrigerant outlet port 22 are overlapped with each other in the axial line "L1" direction and the refrigerant inlet port 12 and the refrigerant outlet port 22 are communicated with each other.

As shown in FIGS. 6(a) and 6(b) and FIG. 7, the valve body 27 is provided in a part of its turning angle with a throttle part 67 that is a minute hole communicated with the refrigerant outlet port 22. A stepped part 73 which is utilized as a flow passage at a minute flow amount time when the throttle part 67 and the refrigerant inlet port 12 are communicated with each other is formed at an outer circumferential edge of a face (upper face) of the valve body 27 facing the valve body drive gear 51. The stepped part 73 is formed so that a portion of an outer circumferential edge of a face (upper face) of the valve body 27 which is abutted with the valve body drive gear 51 is recessed thin over the entire periphery to form a space on its outer peripheral part. As a result, a minute space is formed between the opposed face of the valve body 27 to the valve body drive gear 51 and the opposed face of the valve body drive gear 51 to the valve body 27. The throttle part 67 is communicated with a minute space formed between the valve body 27 that is the stepped part 73 and the valve body drive gear 51 through a recessed part 671 formed so as to surround the throttle part 67. A cross-sectional area of the throttle part 67 is the smallest in the flow passage of refrigerant from the refrigerant inlet port 12 to the first refrigerant outlet port 221 and the second refrigerant outlet port 222.

Since the upper face of the valve body 27 is covered by the opposed face of the valve body drive gear 51 to the valve body 27, a space formed on the outer circumferential edge side of the stepped part 73 is utilized as an opening part 731 of the flow passage. A height in the axial direction of the opening part 731 (space) is smaller than an opening diameter of the throttle part 67, and the opening part 731 is provided over the entire periphery of the outer circumferential edge of an upper face of the valve body 27.

In the stepped part 73 which is a flow passage reaching to the throttle part 67, the opening part 731 is provided so that an individual matter (hereinafter, referred to as a "foreign matter") having a size which is unable to pass the throttle part 67 is unable to enter. In other words, the height in the axial direction of the opening part 731 (space) is set to be smaller than an opening diameter of the throttle part 67 and thus a foreign matter is prevented from flowing into the throttle part 67 and the foreign matter is prevented from disturbing the flow passage. In addition, since the opening part 731 is provided over the entire periphery of the outer circumferential edge of the upper face of the valve body 27, the total area of the opening part 731 is larger than the opening area of the throttle part 67. Therefore, while a foreign matter is prevented from entering, a flow amount of the throttle part 67 can be maintained. Further, even if a plurality of foreign matters is stagnated in the opening part 731, a flow amount of the throttle part 67 is secured to the maximum. A length in a circumferential direction of the opening part 731 (space) may be set so that a flow amount of fluid flowing through the opening part 731 (space) is larger to some extent than a flow amount which is capable of being passed through the throttle part 67. However, assuming a case that a plurality of foreign matters is stagnated in the opening part 731, it is preferable that a length in the circumferential direction of the opening part 731 (space) is set so that a flow amount of fluid flowing through the opening part 731 (space) is sufficiently larger than the flow amount which is capable of passing through the throttle part 67.

Figure 9:
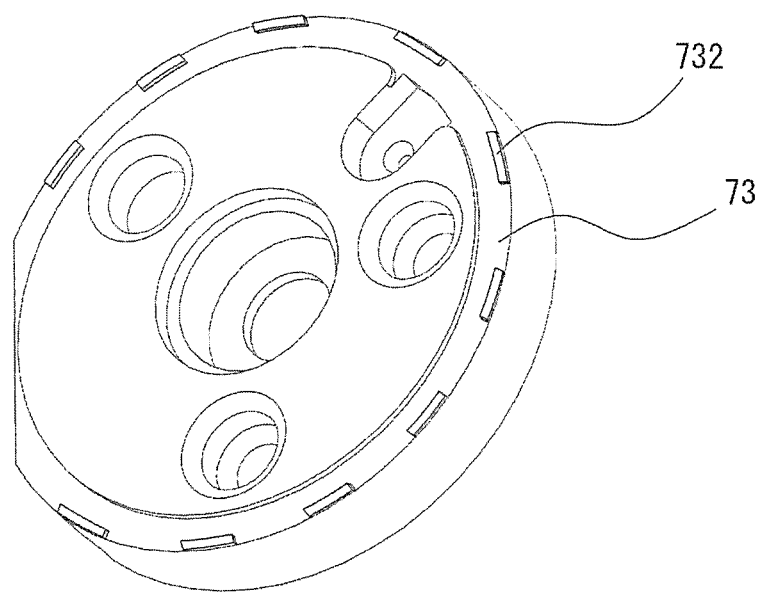
FIG. 9 is a view showing a shielding part mounting example in an opening part of a stepped part.

In a case that the opening part 731 is provided over the entire periphery of the outer circumferential edge, it is preferable that the opening part 731 is, as shown in FIG. 9, formed with a shielding part 732 which closes a part of the opening. This is because that, since the stepped part 73 is formed as a narrow space which is continuously formed in a circumferential direction, a foreign matter may be entered, whose length in the circumferential direction is longer than the diameter of the throttle part 67 if it does not exceed the height in the axial direction of the opening part 731, for example, a thread-like foreign matter such as a hair or a thin plate shaped foreign matter such as a peeled-off piece of coating film. When the shielding part 732 is appropriately disposed in a circumferential direction, entering of such a foreign matter can be restrained. Further, when the shielding part 732 is disposed with intervals shorter than the smallest diameter of the throttle part 67, entering of all foreign matters which cannot pass the throttle part 67 can be prevented. In addition, the shielding parts 732 serve as support projections for supporting the opening part 731 in the axial direction and thus the opening part 731 can be prevented from being closed due to inclination of the valve body 27 and the valve body drive gear 51 caused by flow of the refrigerant in an inside of the valve chamber 36.

The valve body 27 is provided with a cut-out part 79 which is cut from its outer periphery of the valve body 27 toward a turning center side on the opposed face to the valve seat 15. The cut-out part 79 makes the refrigerant outlet port 22 expose in the inside of the valve chamber 36 over a part of a turning angle of the valve body 27 and the refrigerant outlet port 22 and the refrigerant inlet port 12 are communicated with each other. Further, the cut-out part 79 is cut out in a size that both entire peripheries of the first refrigerant outlet port 221 and the second refrigerant outlet port 222 adjacently arranged on a half face of the valve seat face 24 in a circumferential direction are capable of being simultaneously exposed. When the cut-out part 79 is located at a position facing the first refrigerant outlet port 221 and the second refrigerant outlet port 222, the cut-out part 79 is provided with an area which is capable of communicating the inflow hole with the outflow holes through the cut-out part 79. In other words, the cut-out part 79 is provided with an area so that the refrigerant flowed from the refrigerant inlet port 12 is capable of flowing out from both the first refrigerant outlet port 221 and the second refrigerant outlet port 222 through the cut-out part 79.

As shown in FIG. 8, since a flow passage through the cut-out part 79 is formed separately, circulation of a large flow amount depending on the opening diameter of the refrigerant outlet port 22 can be attained in addition to circulation of a minute flow amount through the throttle part 67 and thus versatility of the refrigerant valve device 1 is enhanced. Furthermore, a foreign matter mixed into the refrigerant valve device 1 is flowed out from the refrigerant outlet port 22 to the outside of the refrigerant valve device 1 through the cut-out part 79 and thus a foreign matter is prevented from being accumulatively stagnated in the vicinity of the opening part 731.

As shown in FIGS. 5(a) and 5(b), the opposed face of the valve body drive gear 51 to the valve body 27 is formed with protruded parts 61, 62 and 63 protruded to the valve body 27 side at equal intervals in the circumferential direction, and the opposed face of the valve body 27 to the valve body drive gear 51 is formed with recessed parts 70, 71 and 72 to which the protruded parts 61, 62 and 63 are fitted. The recessed part 72 is a through-hole penetrated to the cut-out part 79 and the protruded part 63 fitted to the recessed part 72 is caulked on the cut-out part 79 side. When the protruded part 63 is caulked, the valve body drive gear 51 is fixed to the valve body 27 without looseness and thus turning of the valve body 27 can be controlled by the stepping motor 60 with a high degree of accuracy. Further, caulking work is performed on the protruded part 63 which is fitted to the recessed part 72 provided in the cut-out part 79 and thus scratches and deformation of the polished bottom face of the valve body 27 are prevented.

As shown in FIGS. 6(a) and 6(b) and FIG. 7, recessed parts 671 and 672 are provided at both ends in the axial direction of the throttle part 67 provided in the valve body 27 so as to be overlapped with each other in the axial line "L1" direction. The throttle part 67 is formed in a thin wall part 673 between the recessed parts 671 and 672, and the throttle part 67 is penetrated through the thin wall part 673 so that its both ends are communicated with the recessed parts 671 and 672. The throttle part 67 is formed with a narrow hole part whose inner diameter is constant and a mortar-shaped opening whose inner diameter dimension is enlarged toward an upper side from an upper end of the narrow hole part. Therefore, influence to the flow amount of the throttle part 67 is reduced when the valve body 27 is deformed by some external pressure and, further, a length of a thin pin having a small diameter of a die for molding the throttle part 67 is minimized and thus durability of the die can be enhanced.

(Control Operation of Refrigerant Flowing Amount)

When the stepping motor 60 is driven by an external control device, rotation of the stepping motor 60 is transmitted to the pinion 50 and the valve body drive gear 51. When the valve body drive gear 51 is turned, the valve body 27 is integrally turned with the valve body drive gear 51 on the valve seat face 24 around the support shaft 25 (axial line "L1").

In this embodiment, as shown in FIG. 7, when the throttle part 67 and the refrigerant outlet port 22 are overlapped with each other in an axial line direction by turning the valve body drive gear 51 to a predetermined angle, in other words, when the throttle part 67 is turned to a position where the throttle part 67 faces the refrigerant outlet port 22 that is an outflow hole, the refrigerant outlet port 22 and the refrigerant inlet port 12 are communicated with each other over the throttle part 67 and thus, a very small amount of the refrigerant depending on the diameter of the throttle part 67 is flowed out from the refrigerant outlet port 22 (hereinafter, this state is also referred to as a "throttle part communicating state").

Further, as shown in FIG. 8, when the valve body drive gear 51 is turned to another predetermined angle so that the cut-out part 79 exposes the refrigerant outlet port 22, the refrigerant outlet port 22 and the refrigerant inlet port 12 are communicated with each other and, as a result, a flow amount of the refrigerant depending on the diameter of the refrigerant outlet port 22 is flowed out from the refrigerant outlet port 22 (hereinafter, this state is referred to as a "cut-out part communicating state").

Figure 10:
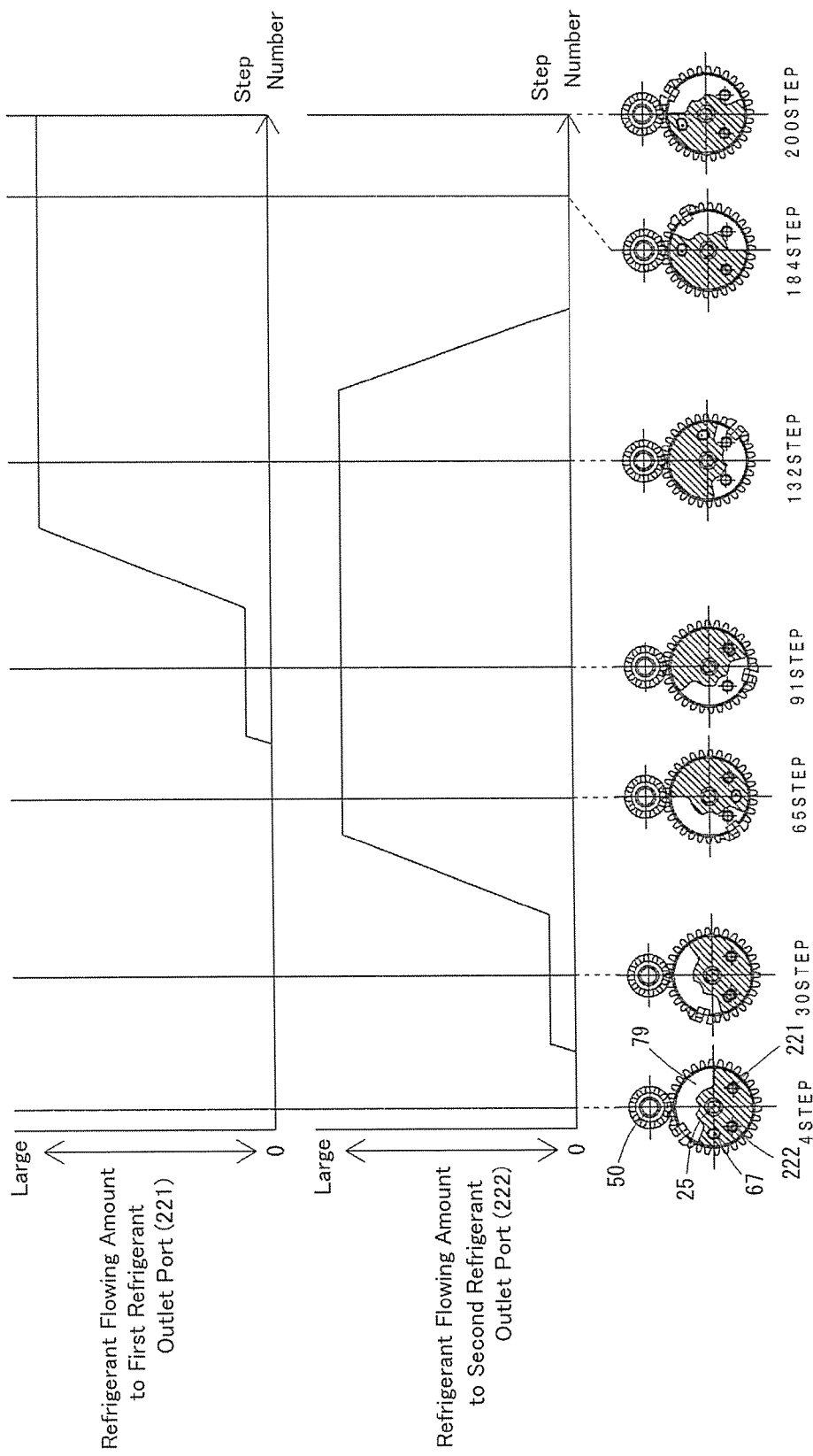
FIG. 10 is an explanatory view showing control operation for a refrigerant flowing amount.

FIG. 10 is an explanatory view showing control operation for a refrigerant flowing amount. A graph on an upper stage in FIG. 10 shows a refrigerant flowing amount which flows out to the first refrigerant outlet port 221 or the second refrigerant outlet port 222 through the refrigerant valve device 1, and a vertical axis indicates a flowing amount and a horizontal axis indicates a driving step number of the stepping motor 60 for driving the valve body 27 from a home position.

When the valve body 27 is located at a home position, the arm part 511 of the valve body drive gear 51 is set in an abutted state with the abutted part 55 of the pinion structural member 54 from a "CW" direction side around the axial line "L1". Therefore, the valve body 27 located at the home position is restricted from turning due to driving of the stepping motor 60 in the "CW" direction.

At the time when the valve body 27 is turned by 4 steps from the home position in the "CCW" direction, both of the first refrigerant outlet port 221 and the second refrigerant outlet port 222 are set in neither the throttle part communicating state nor the cut-out part communicating state and thus the refrigerant does not flow out.

At the time when the valve body 27 is turned by 30 steps from the home position in the "CCW" direction, the second refrigerant outlet port 222 is set in the throttle part communicating state, a very small amount of the refrigerant is flowed out from the second refrigerant outlet port 222. On the other hand, since the first refrigerant outlet port 221 is set in neither the throttle part communicating state nor the cut-out part communicating state, the refrigerant is not flowed out.

At the time when the valve body 27 is turned by 65 steps from the home position in the "CCW" direction, the second refrigerant outlet port 222 is set in the cut-out part communicating state and thus the refrigerant of a flow amount corresponding to its opening diameter is flowed out from the second refrigerant outlet port 222. On the other hand, the first refrigerant outlet port 221 is set in neither the throttle part communicating state nor the cut-out part communicating state and thus refrigerant is not flowed out.

At the time when the valve body 27 is turned by 91 steps from the home position in the "CCW" direction, the second refrigerant outlet port 222 is set in the cut-out part communicating state and thus the refrigerant of a flow amount corresponding to the opening diameter is flowed out from the second refrigerant outlet port 222. On the other hand, the first refrigerant outlet port 221 is set in the throttle part communicating state and thus a very small amount of the refrigerant is flowed out from the first refrigerant outlet port 221.

At the time when the valve body 27 is turned by 132 steps from the home position in the "CCW" direction, both of the first refrigerant outlet port 221 and the second refrigerant outlet port 222 are set in the cut-out part communicating state and thus refrigerants of flow amounts corresponding to their opening diameters are flowed out from the first refrigerant outlet port 221 and the second refrigerant outlet port 222.

At the time when the valve body 27 is turned by 184 steps from the home position in the "CCW" direction, the second refrigerant outlet port 222 is set in neither the throttle part communicating state nor the cut-out part communicating state and thus the refrigerant is not flowed out. On the other hand, since the first refrigerant outlet port 221 is set in the cut-out part communicating state, the refrigerant of a flow amount corresponding to its opening diameter is flowed out from the first refrigerant outlet port 221.

At the time when the valve body 27 is turned by 200 steps from the home position in the "CCW" direction, the second refrigerant outlet port 222 is set in neither the throttle part communicating state nor the cut-out part communicating state and thus the refrigerant is not flowed out. On the other hand, since the first refrigerant outlet port 221 is set in the cut-out part communicating state, the refrigerant of a flow amount corresponding to its opening diameter is flowed out from the first refrigerant outlet port 221. In this state, the arm part 511 of the valve body drive gear 51 is abutted with the abutted part 55 of the pinion structural member 54 from the "CCW" direction side around the axial line "L1". Therefore, further turning in the "CCW" direction of the valve body drive gear 51 is restricted.

Although the present invention has been shown and described with reference to a specific embodiment, the present invention is not limited to the embodiment described above and various changes and modifications will be apparent to those skilled in the art from the teachings herein.

The invention claimed is:

1. A valve device, comprising:
a drive source;
a turning member, being driven and turned by the drive source;
a valve body, being fixed to the turning member in a state that an end face of the valve body and an end face of the turning member in an axial direction are contacted with each other, and the valve body is integrally turned with the turning member; and
a valve seat, being sliding contacted with an end face of the valve body opposite to the end face of the valve body contacting with the turning member;
wherein the valve seat comprises at least one outflow hole for fluid passing through the valve device;
wherein the valve body comprises a throttle part which is a minute hole capable of being communicated with the outflow hole in a part of a turning angle of the valve body; and
wherein a flow passage comprises an opening part which is provided between opposed faces of the turning member and the valve body, so that the throttle part is communicated with an inflow hole for the fluid and so that inflow of an individual matter having a size which is unable to pass through the throttle part is shielded.

2. The valve device according to claim 1, wherein
the flow passage is a stepped part formed in an outer circumferential edge of the opposed face of the valve body or an outer circumferential edge of the opposed face of the turning member,
a height in an axial direction of the opening part of the stepped part is smaller than a minimum diameter of the throttle part, and
a length in a circumferential direction of the opening part of the stepped part is set to be a length so that an area of the opening part obtained by multiplying the length by the height in the axial direction is larger than an opening area of the throttle part.

3. The valve device according to claim 2, wherein
the stepped part is provided over an entire periphery of an outer circumferential edge of the valve body or of an outer circumferential edge of the turning member.

4. The valve device according to claim 2, wherein
the opening part is formed with at least one shielding part for closing a part of an opening of the opening part.

5. The valve device according to claim 2, wherein
the turning member is a gear member provided with a teeth part on a peripheral face of the turning member, and
the stepped part is provided on the valve body.

6. The valve device according to claim 5, wherein
the stepped part is communicated with the throttle part.

7. The valve device according to claim 1, wherein
the valve body comprises a cut-out part which is cut out toward a turning center side from an outer periphery of the valve body on an opposed face to the valve seat, and
the cut-out part exposes an entire periphery of at least one of the outflow holes in a part of a turning angle of the valve body to allow the inflow hole to communicate with the outflow hole.

8. The valve device according to claim 7, wherein
the cut-out part is disposed at a position different from a position of the throttle part,
the cut-out part is provided with a size which is capable of exposing an entire periphery of at least one of the outflow hole, and
the inflow hole and the outflow hole are communicated with each other through the cut-out part at a position where the cut-out part faces the outflow hole.

9. The valve device according to claim 7, wherein
the opposed face of the turning member to the valve body is formed with a protruded part which is protruded to a side of the valve body,
the opposed face of the valve body to the turning member is formed with a recessed part to which the protruded part is fitted,
at least a pair of the protruded part and the recessed part are provided,
at least one of the recessed part is a through-hole which is penetrated to the cut-out part, and the protruded part fitted to the recessed part which is the through-hole is caulked on a side of the cut-out part and thereby the valve body is fixed to the turning member.

10. The valve device according to claim 7, wherein
the flow passage having the opening part is a stepped part formed in an outer circumferential edge of the opposed face of the valve body or an outer circumferential edge of the opposed face of the turning member,
a height in an axial direction of the opening part of the stepped part is smaller than a minimum diameter of the throttle part, and
a length in a circumferential direction of the opening part of the stepped part is set to be a length so that an area of the opening part obtained by multiplying the length by the height in the axial direction is larger than an opening area of the throttle part.

11. The valve device according to claim 1, wherein
the throttle part is formed in a thin wall part between recessed parts with larger diameters than the throttle part which are provided at both ends in an axial direction of the valve body, so as to be overlapped with each other in the axial direction of the valve body, and
the throttle part is formed with an opening in a mortar shape.

12. The valve device according to claim 11, wherein
the flow passage is a stepped part formed in an outer circumferential edge of the opposed face of the valve body or an outer circumferential edge of the opposed face of the turning member,
a height in an axial direction of the opening part of the stepped part is smaller than a minimum diameter of the throttle part, and
a length in a circumferential direction of the opening part of the stepped part is set to be a length so that an area of the opening part obtained by multiplying the length by the height in the axial direction is larger than an opening area of the throttle part.

13. The valve device according to claim 12, wherein
the stepped part is communicated with the throttle part.

14. The valve device according to claim 13, wherein
the valve body comprises a cut-out part which is cut out toward a turning center side from an outer periphery of the valve body on an opposed face to the valve seat, and
the cut-out part exposes an entire periphery of at least one of the outflow holes in a part of a turning angle of the valve body to allow the inflow hole to communicate with the outflow hole.

15. The valve device according to claim 1, further comprising:
a base to which the valve seat is fixed; and
a sealing cover in cup-shape,
wherein the base is covered with the sealing cover so that the inflow hole for the fluid, a rotor of a motor structuring the drive source, the turning member, the valve body, and a valve seat face of the valve seat are covered by the sealing cover, and a valve chamber provided with the inflow hole and the outflow hole is sectioned by the sealing cover together with the base, and
wherein when the throttle part of the valve body is turned to a position facing the outflow hole by the motor, the fluid is passed through the throttle part from the opening part and is flowed out from the outflow hole.

16. The valve device according to claim 15, wherein
the opening part is a space formed between the opposed face of the turning member on a side of the valve body and the opposed face of the valve body on a side of the turning member,
a width in an axial direction of the space is smaller than a minimum diameter of the throttle part, and
a length in a circumferential direction of the space is set so that a flow amount of the fluid flowing through the space is larger than a flow amount which is capable of passing the throttle part.

17. The valve device according to claim 16, wherein
the space as the opening part is formed by thinning an entire periphery of a portion of an outer circumferential edge of an abutted face of the valve body with the turning member,
the valve body is formed with a recessed part surrounding the throttle part, and
the recessed part is communicated with the space so that the fluid from the opening part is flowed into the throttle part through the recessed part.

18. The valve device according to claim 16, wherein
the drive source is a stepping motor,
a rotor of the stepping motor is disposed to an inner side of the sealing cover,
the rotor is rotatably supported by a rotor support shaft, and an upper end of the rotor support shaft is fixed to a bottom part of the sealing cover, and an lower end of the rotor support shaft is fixed to a center of the base,
the turning member provided with a teeth part engaging with a pinion of the rotor and the valve body are rotatably supported by a support shaft fixed to the valve seat, and
a bottom face of the valve body and the valve seat face are polished flatly and closely contacted with each other without a gap.

19. The valve device according to claim 16, wherein
the valve body is provided with a cut-out part which is cut out toward a turning center side from an outer periphery of the valve body at a position different from a position of the throttle part on an opposed face to the valve seat,
the cut-out part is cut out in a size so as to expose an entire periphery of the outflow hole in a part of a turning angle of the valve body, and
the inflow hole and the outflow hole are communicated with each other through the cut-out part at a position where the cut-out part faces the outflow hole.

* * * * *